United States Patent Office 3,313,118
Patented Apr. 11, 1967

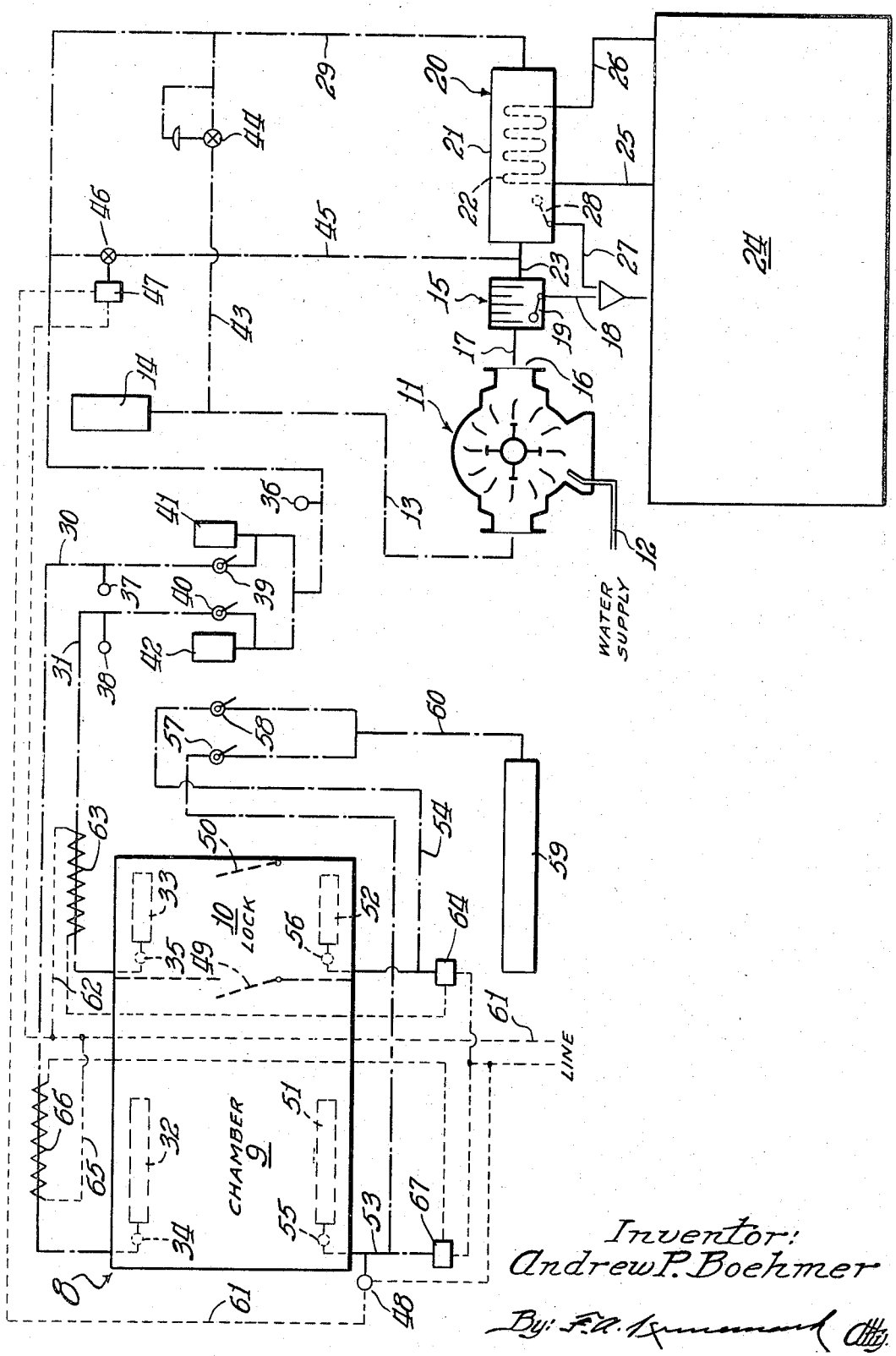

3,313,118
HUMIDITY AND TEMPERATURE CONTROL
SYSTEM FOR PRESSURE CHAMBERS
Andrew P. Boehmer, Barrington, Ill., assignor to Borg-Warner Corporation, Chicago, Ill., a corporation of Illinois
Filed June 11, 1965, Ser. No. 463,192
8 Claims. (Cl. 62—176)

The present invention relates to a humidity and temperature control system for enclosures to improve environmental conditions and more particularly to such a system for pressure chambers currently known as hyperbaric chambers.

Hyperbaric chambers generally comprise chambers for therapeutic use and house patients which are attended by medical personnel. These chambers comprise a main chamber and an air lock section and are air conditioned in the general sense. There is a constant input of fresh air such that a high rate of air change per hour occurs. The pressure in these chambers are held at variable levels as conditions demand which calls for extensive piping, valves, controls, etc.

The air lock section serves as a means for ingress and egress and comprises a compartment as an integral part of the chamber, with a door there between and an exit door to the outside.

Hyperbaric chambers are designed for therapeutic use and it is highly important that humidity and temperatures be maintained at a predetermined constant level in order to provide the best environment for the treatment of patients.

Also, humidity control is of further importance with regard to controlling static buildup in clothing, bedding, surgical materials, etc. This is particularly important during periods of oxygen administration in the treatment of patients.

In currently available hyperbaric chambers, steam is introduced into the chamber to provide the desired humidity level. In the present invention a water sealed compressor is used to provide the desired chamber pressure. With the use of this type of compressor highly moisture saturated air is provided, the level of which is controlled in accordance with the present invention as hereinafter more fully explained.

It is therefore an important object of the present invention to provide an improved humidity and temperature control means for air conditioned enclosures.

It is a particularly important object of the present invention to provide an improved humidity and temperature control system for air conditioned pressure chambers.

It is also an important object of the present invention to provide an air compressor which uses water as a sealing means thereby providing highly moisture saturated air, for air conditioned pressure chambers, the humidity and temperature of which is maintained at a predetermined level by humidity and temperature control means, according to the present invention.

The present invention consists of the novel constructions, arrangements and devices to be hereinafter described and claimed for carrying out the above stated objects and such other objects as will be apparent from the following description of preferred forms of the invention, illustrated with reference to the accompanying drawing, wherein:

The sole figure is a diagrammatic representation of a humidity and temperature control system for hyperbaric chambers according to the present invention.

Referring to the sole drawing, a block diagram of a pressure chamber 8 is shown which comprises a main chamber 9 and an air lock section 10.

A water sealed compressor 11 serves to provide air to the pressure chamber 8. The water intake side and the air intake side of the water sealed compressor 11 are connected to a source of water supply by pipe 12 and to ambient air by an air intake conduit 13 which is provided with an air intake silencer 14 respectively.

A separator 15 is connected to an exhaust port 16 of the water sealed compressor 11 by a conduit 17 whereby the water, which is exhausted with the air is separated therefrom and drained from the separator 15 by suitable means such as a tube 18 provided with a float valve 19.

A dehumidifier 20, comprising a shell 21 enclosing a fluid coil 22, is connected to the separator 15 by a conduit 23 whereby the air is conveyed to the dehumidifier 20 and subjected to dehumidification by the fluid coil 22 which is connected at each of its ends with respect to an air conditioning means 24, shown in block form, by conduits 25 and 26 respectively. The moisture condensed from the air is drained by a pipe 27, provided with a float valve 28.

A conduit 29 interconnects the dehumidifier 20 with conduits 30 and 31 which extend into the main chamber 9 and the lock 10, respectively and are provided with air intake silencers 32 and 33 respectively, and shut off valves 34 and 35, respectively.

The conduits 29, 30 and 31 are provided with gauges 36, 37 and 38, respectively, and the conduits 30 and 31 are also provided with manual regulators 39 and 40 respectively, and flow meters 41 and 42 respectively.

A conduit 43 provided with a control valve 44 for maintaining controlling the pressure in the pressure chamber 8, interconnects the conduits 13 and 29. A conduit 45 interconnects conduits 25 and 29 and is provided with a control valve 46 which is operably connected to a solenoid 47 connected with respect to a humidistat 48 thereby controlling the humidity in the pressure chamber 8 for the reason that the moisture-saturated air in conduit 45 is controlled in volume by the control valve 46 before entering the conduit 29.

A door 49 serves as a communicable means between the main chamber 9 and the air lock section 10 which is provided with a door 50 serving as a means for ingress and egress for the pressure chamber 10.

Air exhaust silencers 51 and 52 for the air exhausted from the main chamber 9 and the air lock section 10, respectively, are connected to conduits 53 and 54, respectively, which are provided with shut-off valves 55 and 56, respectively, and manual regulators 57 and 58, respectively.

An exhaust silencer 59 is connected to the conduits 53 and 54 by a conduit 60, whereby air exhausts silently outside the pressure chamber 8.

An electric circuit 61 transmits current to the solenoid valve 47 and to the humidistat 48 for their operation.

An electric circuit 62 transmits current to a heating element 63 for heating the air in the conduit 31 which supplies air therefrom to the air lock section 10, and also transmits current to a thermostat 64 which regulates the temperature in the air lock section 10.

An electric circuit 65 transmits current to a heating element 66 for heating the air in the conduit 30 which supplies air therefrom to the main chamber 9, and also transmits current to a thermostat 67 which regulates the temperature in the main chamber 9.

In operation a mixture of water and air are delivered by the water sealed compressor 11 to the separator 15 by way of a conduit 17 whereby the water is separated from the air and drained out through the tube 18.

The air, which is highly saturated with moisture, passes on through the dehumidifier 20 which cools it and condenses the moisture which is drained from the dehumidifier 20 through the pipe 27.

The air thus cooled and dehumidified passes on through conduit 29 and is delivered to the main chamber 9 by way of conduit 30.

The air is exhausted from the main chamber 9 by way of the conduit 53 which is connected to the humidistat 48 which senses the humidity of the air exhausted and signals the solenoid 47, through the electric circuit 61, to operate the control valve 46 in such a manner that the required amount of highly moisture saturated air from conduit 45 is passed into the conduit 29 to satisfy the requirement of the humidistat 48, whereby the required humidity in the main chamber 9 is maintained at a predetermined value, based on the setting of the humidistat 48.

Heating elements 63 and 66 are connected with respect to the conduits 31 and 30, respectively, which provide air to the air lock section 10 and the main chamber 11, respectively, whereby the air is brought up to a desired temperature which is determined by the setting of thermostats 64 and 67, respectively, which are connected to the electric circuits 62 and 65 respectively.

Briefly as to operation with respect to humidity control, the air provided by the water sealed compressor 11 for the pressure chamber 8 is highly saturated with moisture. Particles of water together with the highly moisture saturated air is passed on to the separator 15 through conduit 17 where the water particles are removed and drained through tube 18.

The highly moisture saturated air is then passed on to the dehumidifier 20 by way of conduit 23 where the humidity is reduced to a level that does not exceed that which is called for in the pressure chamber 8. The air then passes on to the pressure chamber 8 as heretofore shown and as it is exhausted therefrom the humidistat 48 senses the humidity and signals the solenoid valve 47 to operate the control valve 46 in such a manner that the required volume of highly moisture saturated air in conduit 45, as heretofore shown, is passed into conduit 29 to satisfy the requirement of the humidistat 48 based on a predetermined setting.

While the present invention has been described in connection with a certain specific embodiment thereof, it is to be understood that this is by way of illustration and not by way of limitation and the scope of this invention is defined solely by the appended claims which should be construed as broadly as the prior art will permit.

I claim:
1. In a humidity and temperature control system for improving environmental conditions in an inclosure having exhaust means comprising:
   (a) an air conditioning means for said inclosure;
   (b) a water sealed compressor connected to a source of water supply and to ambient air;
   (c) a separator connected to said water sealed compressor by a first conduit for conveying water and air discharged from said compressor to said separator which separates said water from said air;
   (d) a second conduit interconnecting said separator and a dehumidifier comprising a shell which houses a fluid coil connected with respect to said air conditioning means whereby said air transmitted to said dehumidifier is cooled and subjected to dehumidification;
   (e) conduit means interconnecting said dehumidifier with said inclosure;
   (f) a third conduit, provided with a control valve, interconnecting said second conduit and said conduit means;
   (g) a humidistat sensitive to the humidity in said inclosure and connected with respect thereto;
   (h) a solenoid for operating said control valve;
   (i) an electric circuit interconnecting said humidistat and said solenoid whereby the flow of highly moisture saturated air in said third conduit to said conduit means is controlled as determined by the said humidistat thereby controlling the humidity of the air in said inclosure are predetermined by the said humidistat.

2. In humidity and temperature control system for an enclosure according to claim 1 wherein means for controlling exhausting of said air from said inclosure are provided to thereby provide change of air.

3. In a humidity and temperature control system for improving environmental conditions in an inclosure having exhaust means comprising:
   (a) an air conditioning means for said inclosure;
   (b) a water sealed compressor connected to a source of water supply and to ambient air;
   (c) a separator connected to said water sealed compressor by a first conduit for conveying water and air discharged from said compressor to said separator which separates said water from said air;
   (d) a second conduit interconnecting said separator and a dehumidifier comprising a shell which houses a fluid coil connected with respect to said air conditioning means whereby said air transmitted to said dehumidifier is cooled and subjected to dehumidification;
   (e) conduit means interconnecting said dehumidifier with said inclosure;
   (f) a third conduit, provided with a control valve, interconnecting said second conduit and said conduit means;
   (g) a humidistat sensitive to the humidity in said inclosure and connected with respect thereto;
   (h) a solenoid for operating said control valve;
   (i) an electric circuit interconnecting said humidistat and said solenoid whereby the flow of highly moisture saturated air in said third conduit to said conduit means is controlled as determined by the said humidistat thereby controlling the humidity of the air in said inclosure as predetermined by the said humidistat; and
   (j) means for controlling the temperature in said inclosure.

4. In a humidity and temperature control system for improving environmental conditions in a hyperbaric chamber having exhaust means comprising:
   (a) an air conditioning means for said inclosure;
   (b) a water sealed compressor connected to a source of water supply and to ambient air;
   (c) a separator connected to said water sealed compressor by a first conduit for conveying water and air discharged from said compressor to said separator which separates said water from said air;
   (d) a second conduit interconnecting said separator and a dehumidifier comprising a shell which houses a fluid coil connected with respect to said air conditioning means whereby said air transmitted to said dehumidifier is cooled and subjected to dehumidification;
   (e) conduit means interconnecting said dehumidifier with said hyperbaric chamber;
   (f) a third conduit, provided with a control valve, interconnecting said second conduit and said conduit means;
   (g) a humidistat sensitive to the humidity in said hyperbaric chamber and connected with respect thereto;
   (h) a solenoid for operating said control valve; and
   (i) an electric circuit interconnecting said humidistat and said solenoid whereby the flow of highly moisture saturated air in said third conduit to said conduit means is controlled as determined by the said humidistat thereby controlling the humidity of the air in said hyperbaric chamber as predetermined by the said humidistat.

5. In a humidity and temperature control system according to claim 4 wherein means for controlled exhausting of said air from said hyperbaric chamber are provided to thereby provide change of air.

6. In a humidity and temperaure control system for improving environmental conditions in a hyperbaric chamber having exhaust means comprising:

(a) an air conditioning means for said hyperbaric chamber;
(b) a water sealed compressor connected to a source of water supply and to ambient air by an air conduit;
(c) a separator connected to said water sealed compressor by a first conduit for conveying water and air discharged from said compressor to said separator which separates said water from said air;
(d) a second conduit interconnecting said separator and a dehumidifier comprising a shell which houses a fluid coil connected with respect to said air conditioning means, whereby said air transmitted to said dehumidifier is cooled and subjected to dehumidification;
(e) conduit means interconnecting said dehumidifier with said hyperbaric chamber;
(f) a third conduit, provided with a control valve, interconnecting said second conduit and said conduit means;
(g) a humidistat sensitive to the humidity in said hyperbaric chamber and connected with respect thereto;
(h) a solenoid for operating said control valve;
(i) an electric circuit interconnecting said humidistat and said solenoid whereby the flow of highly moisture saturated air in said third conduit to said conduit means is controlled as determined by the said humidistat thereby controlling the humidity of the air in said hyperbaric chamber as predetermined by the said humidistat; and
(j) means for controlling the temperature in said hyperbaric chamber.

7. In a humidity and temperature control system for improving environmental conditions in a hyperbaric chamber having exhaust means comprising:
(a) an air conditioning means for said hyperbaric chamber;
(b) a water sealed compressor connected to a source of water supply and to ambient air;
(c) a separator connected to said water sealed compressor by a first conduit for converting water and air discharged from said compressor to said separator which separates said water from said air;
(d) a second conduit interconnecting said separator and a dehumidifier comprising a shell which houses a fluid coil connected with respect to said air conditioning means whereby said air transmitted to said dehumidifier is cooled and subjected to dehumidification;
(e) conduit means interconnecting said dehumidifier with said hyperbaric chamber;
(f) a third conduit, provided with a control valve, interconnecting said second conduit and said conduit means;
(g) a humidistat sensitive to the humidity in said hyperbaric chamber and connected with respect thereto;
(h) a solenoid for operating said control valve;
(i) an electric circuit interconnecting said humidistat and said solenoid whereby the flow of highly moisture saturated air in said third conduit to said conduit means is controlled as determined by the said humidistat thereby controlling the humidity of the air in said hyperbaric chamber as predetermined by the said humidistat; and
(j) means for controlling the pressure in said hyperbaric chamber.

8. In a humidity and temperature control system for a hyperbaric chamber according to claim 7 wherein the said pressure control comprises a fourth conduit, provided with a control valve, interconnecting said conduit means and an intake air conduit.

References Cited by the Examiner

UNITED STATES PATENTS

| | | | |
|---|---|---|---|
| 1,819,643 | 8/1931 | Fleisher | 62—92 X |
| 1,863,578 | 6/1932 | Morse | 62—271 X |
| 2,332,975 | 10/1943 | Palmer | 62—92 X |
| 3,153,914 | 10/1964 | Meckler | 62—92 X |

MEYER PERLIN, *Primary Examiner.*